United States Patent
Hoggan et al.

(10) Patent No.: US 9,961,067 B2
(45) Date of Patent: *May 1, 2018

(54) ZERO SIGN-ON AUTHENTICATION

(71) Applicant: Cable Television Laboatories, Inc., Louisville, CO (US)

(72) Inventors: Stuart A. Hoggan, Longmont, CO (US); Seetharama R. Durbha, Louisville, CO (US)

(73) Assignee: Cable Television Laboratories, Inc., Louisville, CO (US)

(*) Notice: Subject to any disclaimer, the term of this patent is extended or adjusted under 35 U.S.C. 154(b) by 279 days.

This patent is subject to a terminal disclaimer.

(21) Appl. No.: 14/617,757

(22) Filed: Feb. 9, 2015

(65) Prior Publication Data

US 2015/0172277 A1    Jun. 18, 2015

Related U.S. Application Data

(63) Continuation of application No. 13/173,630, filed on Jun. 30, 2011, now Pat. No. 8,955,078.

(51) Int. Cl.
*G06F 7/04* (2006.01)
*H04L 29/06* (2006.01)
*H04L 9/32* (2006.01)

(52) U.S. Cl.
CPC ........ *H04L 63/0815* (2013.01); *H04L 9/3263* (2013.01); *H04L 63/083* (2013.01); *H04L 63/0823* (2013.01); *H04L 63/0876* (2013.01)

(58) Field of Classification Search
CPC ............... H04L 63/0815; H04L 63/083; H04L 63/0876; H04L 9/3263

USPC .................. 380/200; 726/8, 12, 27; 725/118
See application file for complete search history.

(56) References Cited

U.S. PATENT DOCUMENTS

| | | |
|---|---|---|
| 5,991,878 A | 11/1999 | McDonough et al. |
| 5,999,971 A | 12/1999 | Buckland |
| 6,286,038 B1 | 9/2001 | Reichmeyer et al. |
| 6,442,588 B1 | 8/2002 | Clark et al. |
| 7,346,923 B2 | 3/2008 | Atkins et al. |
| 7,451,312 B2 | 11/2008 | Medvinsky et al. |
| 7,861,288 B2 | 12/2010 | Tsuruoka et al. |
| 8,103,876 B2 | 1/2012 | Little et al. |
| 8,261,070 B2 | 9/2012 | Angus et al. |

(Continued)

FOREIGN PATENT DOCUMENTS

| | | |
|---|---|---|
| JP | 2005-269288 | 9/2005 |
| JP | 2008-15696 | 1/2008 |
| WO | WO2013/003419 | 1/2013 |

OTHER PUBLICATIONS

Translation of Japanese office action dated Jan. 20, 2015 for corresponding application JP 2014-518942.

(Continued)

*Primary Examiner* — Ashok Patel
*Assistant Examiner* — Abdullah Almamun
(74) *Attorney, Agent, or Firm* — Great Lakes Intellectual Property, PLLC

(57) ABSTRACT

A method of facilitating zero sign-on access to media services depending on trust credentials. The trust credentials may be cookies, certificates, and other data sets operable to be stored on a device used to access the media services such that information included therein may be used to control the zero sign-on capabilities of the user device.

11 Claims, 6 Drawing Sheets

(56) References Cited

U.S. PATENT DOCUMENTS

| | | |
|---|---|---|
| 8,332,925 B2 | 12/2012 | Chen et al. |
| 2002/0099936 A1 | 7/2002 | Kou et al. |
| 2003/0142673 A1 | 7/2003 | Patil et al. |
| 2004/0143652 A1* | 7/2004 | Grannan ................. H04L 67/04 709/223 |
| 2004/0264699 A1* | 12/2004 | Meandzija .......... H04L 63/0435 380/270 |
| 2005/0239445 A1* | 10/2005 | Karaoguz ........... H04L 12/2803 455/414.1 |
| 2006/0005032 A1 | 1/2006 | Cain et al. |
| 2006/0020782 A1 | 1/2006 | Kakii |
| 2006/0041931 A1 | 2/2006 | Boxall et al. |
| 2006/0059158 A1 | 3/2006 | Ussery et al. |
| 2006/0107217 A1 | 5/2006 | Lu et al. |
| 2006/0129499 A1 | 6/2006 | Combar et al. |
| 2006/0156392 A1* | 7/2006 | Baugher ................ G06F 21/10 726/5 |
| 2006/0230278 A1 | 10/2006 | Morris |
| 2007/0233540 A1 | 10/2007 | Sirota |
| 2007/0289002 A1* | 12/2007 | van der Horst ......... G06F 21/42 726/9 |
| 2008/0141296 A1* | 6/2008 | Yoon ................... H04N 7/17318 725/31 |
| 2008/0247541 A1 | 10/2008 | Cholas et al. |
| 2010/0042735 A1 | 2/2010 | Blinn et al. |
| 2010/0199332 A1 | 8/2010 | Bachmann et al. |
| 2011/0060649 A1 | 3/2011 | Dunk et al. |
| 2012/0072979 A1 | 3/2012 | Cha et al. |
| 2012/0167185 A1 | 6/2012 | Menezes et al. |
| 2013/0035995 A1 | 2/2013 | Patterson et al. |
| 2013/0111576 A1 | 5/2013 | Devine et al. |
| 2013/0239194 A1 | 9/2013 | Raleigh |

OTHER PUBLICATIONS

International Search Report and Written Opinion for corresponding PCT Application No. PCT/US12/44328, dated Oct. 1, 2012, 9 pages.

* cited by examiner

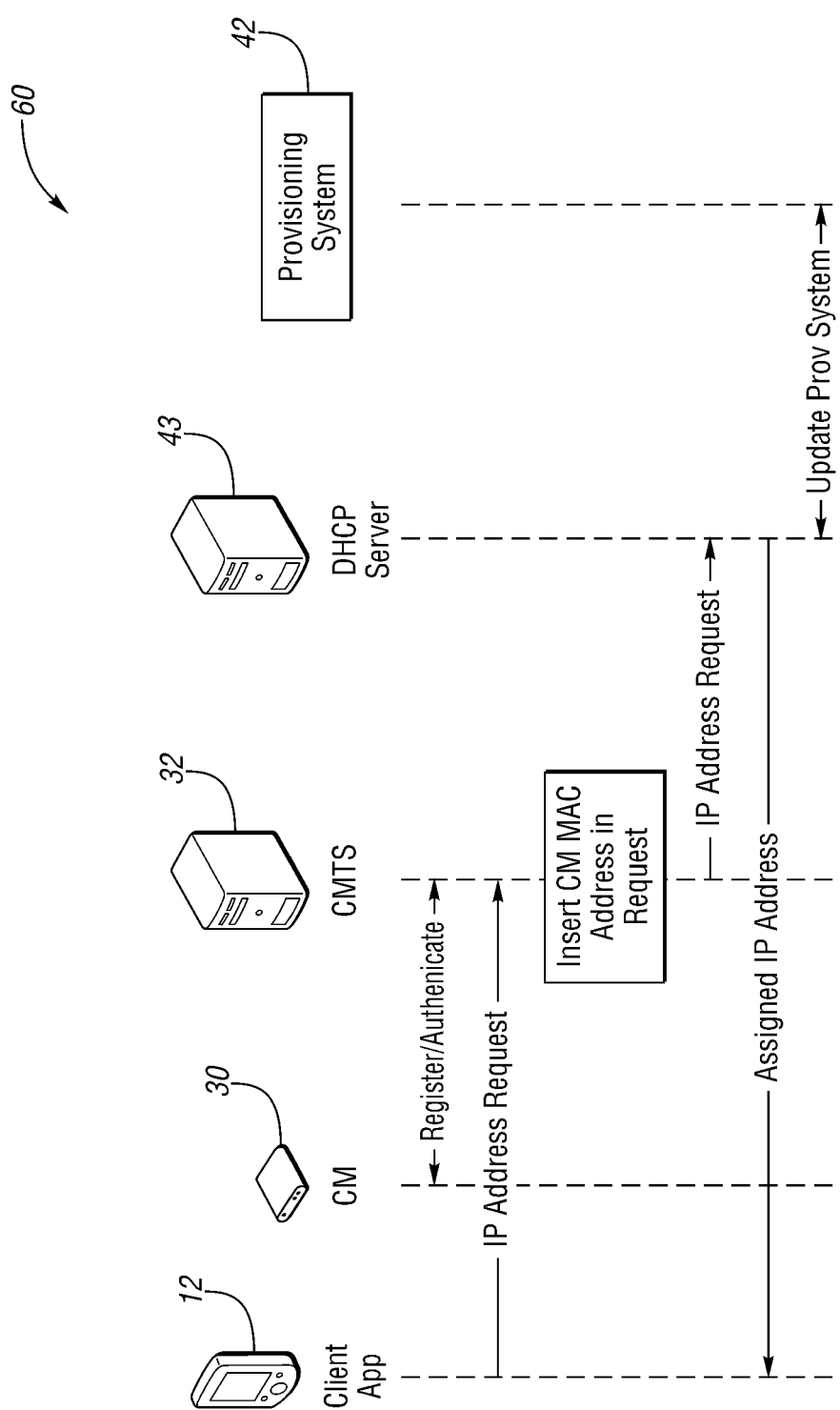

though; specific structural and functional details disclosed herein are not to be interpreted as limiting, but merely as a representative basis for teaching one skilled in the art to variously employ the present invention.

ZERO SIGN-ON AUTHENTICATION

CROSS-REFERENCE TO RELATED APPLICATIONS

This application is a continuation of U.S. application Ser. No. 13/173,630, filed Jun. 30, 2011, the disclosure of which is hereby incorporated in its entirety by reference herein.

TECHNICAL FIELD

The present invention relates to facilitating user access to media services without requiring a user to sign-on or enter a password as part of an authentication process required before permitting access to the media services.

BACKGROUND

People who use the Internet to buy goods and services typically have to establish an identity at each business, which may require the customer to complete a sign-on process of entering a username and password each time a business's website is accessed or any other time services are requested. As more and more businesses rely on online services, customers may be required to keep track of numerous username and password\combinations, i.e., one for each website, which any become a burden on the users. There is also the risk of identity theft of the user's username and passwords since that information may be stored in so many different places. Accordingly, a need exist to limit the number of sign-on operations a user must perform and/or the number of location at which the user's username and password combinations are stored.

BRIEF DESCRIPTION OF THE DRAWINGS

The present invention is pointed out with particularity in the appended claims. However, other features of the present invention will become more apparent and the present invention will be best understood by referring to the following detailed description in conjunction with the accompany drawings in which:

FIG. 3 illustrates a messaging diagram of address allocation messaging contemplated by one non-limiting aspect of the present invention.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
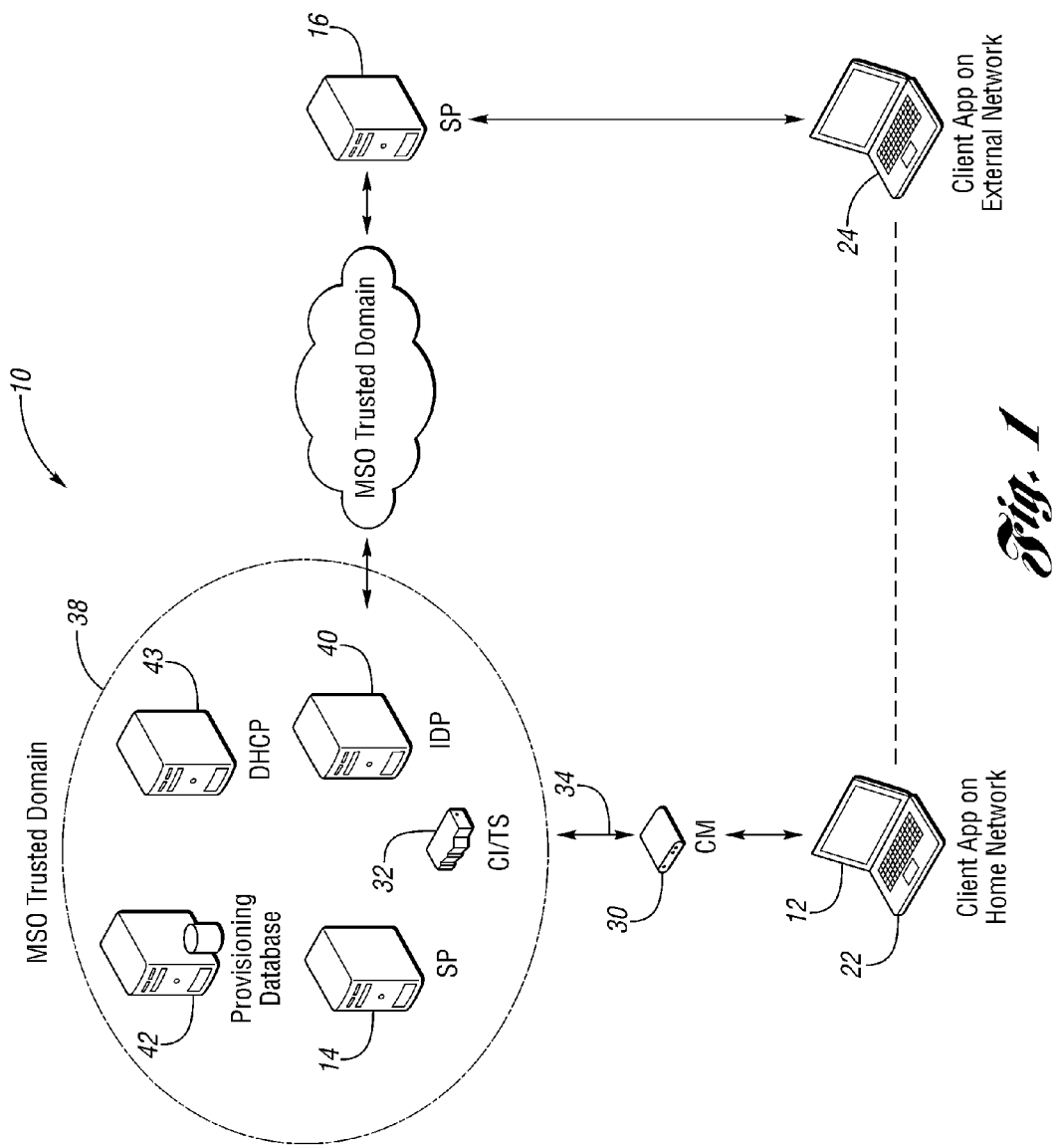
FIG. 1 illustrates a zero sign-on system contemplated by one non-limiting aspect of the present invention.

FIG. 1 illustrates a zero sign-on system 10 contemplated by one non-limiting aspect of the present invention. The system 10 supports zero sign-on access to any type of suitable media service for a number of user devices 12. For exemplary purposes, a single mobile user device 12, e.g., a mobile computer, phone, tablet, PDA, etc., is shown to be accessing IP based services through signaling exchanged with first and second service providers (SPs) 14, 16. The user device 12 may be any other device, including but not limited to a settop box (STB), media terminal adapter (MTA), and media player. The user device 12 may include a client application embodied in a computer-readable medium having stored thereon a plurality of instructions including instructions which, when executed by a processor, cause the processor to facilitate the operation contemplated by the present invention to support zero sign-on.

The client application may be configured to provide a user/subscriber interface and to otherwise support interactions with the service provider of multiple system operator (MSO) 14. It could be a common web browser, such as Internet Explorer or Firefox, or it could be a custom application or any corresponding type of operating system. The client application can be configured to operate on any type of device 12 such as a PC, laptop, or smart phone. A first position 22 of the user device 12 is shown to correspond with the home or other location of a user that subscribes to services of the first service provider 14, which may be the home of a user associated with the user device or the home of another individual that happens to subscribe to services from the same first service provider 14. A second position 24 corresponds with the user device 12 changing locations to another location, such as a Wi-Fi hotspot, where the second service provider 16 is required to support at least some of the signaling necessary for the user device to access services of the first service provider 14.

At the first location 12, the user device 12 is shown to be connected to a cable modem (CM) 30 to facilitate data exchange with a Cable Modem Termination System (CMTS) 32 of the service provider. The cable modem 30 and the CMTS 32 may cooperate to enable Data Over Cable Service Interface Specification (DOCSIS) compliant bi-directional high speed data access across a cable network 34. The cable modem 30 may be located in a Subscriber's home and may be embedded in a VoIP device (eMTA) or set top. The CMTS 32 may be a central manager associated with the service provider 14 to controls network access. A trusted domain 38 of the service provider 14 generally corresponds with multiple CMTSs 32, and the cable modems 30 they support, and other devices 40, 42, 43 with which it manages to facilitate interacting media services with its subscribers.

The second service provider 16 not shown to include a trusted domain, however, it may similarly include such a trusted domain. The trust domain of the second service provider 16 is not shown since they user device 12 may not be a subscriber to the second service provider 16, and thereby, an untrusted user device. The service providers 14, 16 may be configured to simultaneously support communications between trusted and untrusted user devices, or more specifically, between access points used by those devices to communicate with the service providers. The cable modem 30 and/or CMTS 32 acts as the access point when the user device 12 is at the first position 22 and the wireless router or other gateway (not shown) acts as the access point when the user device is at the second location 24. Since the access point at the second location 24 is not within the trusted domain of the first service provider 14, it is considered as an untrusted access point with respect to the first service provider 14 (it may be a trusted access point with respect to the second service provider 16).

The present invention, while predominately described with respect to supporting access to media services offered by satellite, broadcast, and cable television service providers; high speed data service providers; and telephony service providers, fully contemplates its use with any type of media service that relies on signal communications from a service provider, and optionally, where the service provider is able to communicate the signals to different locations and to different types of user devices. One exemplary illustration of providing television services is set forth to demonstrate one useful aspect of the present invention in so far as supporting IP streaming of television programs to user devices 12 regardless of the location of the user device 12 and the access point (e.g., trusted and untrusted) used to facilitate communication of the related signaling. The television services may include subscriber specific services, such as personal video recording (PVR), premium channels, etc., and non-subscriber specific services, such as broadcast programming, public access, etc.

The streaming of the television signals may be supported with the CMTS 32 in the case of a cable based communication system or some other analogous devices in the case of satellite, high speed data, and telephony based service provider system configurations. The service provider 14 may include a server, headend unit, or other device to support and source television programs, previously recorded video (VOD, PVR, etc.), and other media content (video games, webpages, etc.) to the CMTS 32 for subsequent packaging and transmission to one or more access points (gateways). U.S. application Ser. No. 12/650,664 filed Dec. 31, 2009, the disclosure of which is incorporated in its entirety by reference herein, discloses a similar system of facilitating zero sign-on basted on a trust state of cable modems or other network access parts configured to support message communications between the CMTS and the local user devices.

A provisioning database 42 may be associated with the first service provider and included in the trusted domain to facilitate regulation of the media services available to and/or consumed by the user device 12. The provisioning database 42 may contain information about a level of service or types of services paid for by a subscriber. It may also maintain a list of IP address that have been assigned to client applications associated with the cable modem 30, e.g., if the subscriber allows multiple user devices to connect to its cable modem, each of those user devices may be assigned a unique IP address within the subnet of the corresponding CMTS 32. Optionally, each of the assigned IP addresses may be bound with a MAC address assigned to the supporting cable modem 30 in order to facilitate associating IP addresses with a particular cable modem 30 and/or subscriber.

While the first location 22 is shown to support DOCSIS based communications, the present invention is not intended to be so limited and fully contemplates the service providers 14, 16 being configured to support virtually any other type of communications, including cellular or other wireline/wireless phone related communications. The service providers 14, 16 may be configured to facilitate access to virtually any type of electronic media or media services/content. When a subscriber wants to access content they can command client application to request it from the service providers 14, 16. Before the service providers 14, 16 allows access to content, either through a trusted or untrusted access point, it may be required to authenticate the user device 12 and/or the subscriber thereof, and then check if they are authorized for the requested access.

Figure 2:
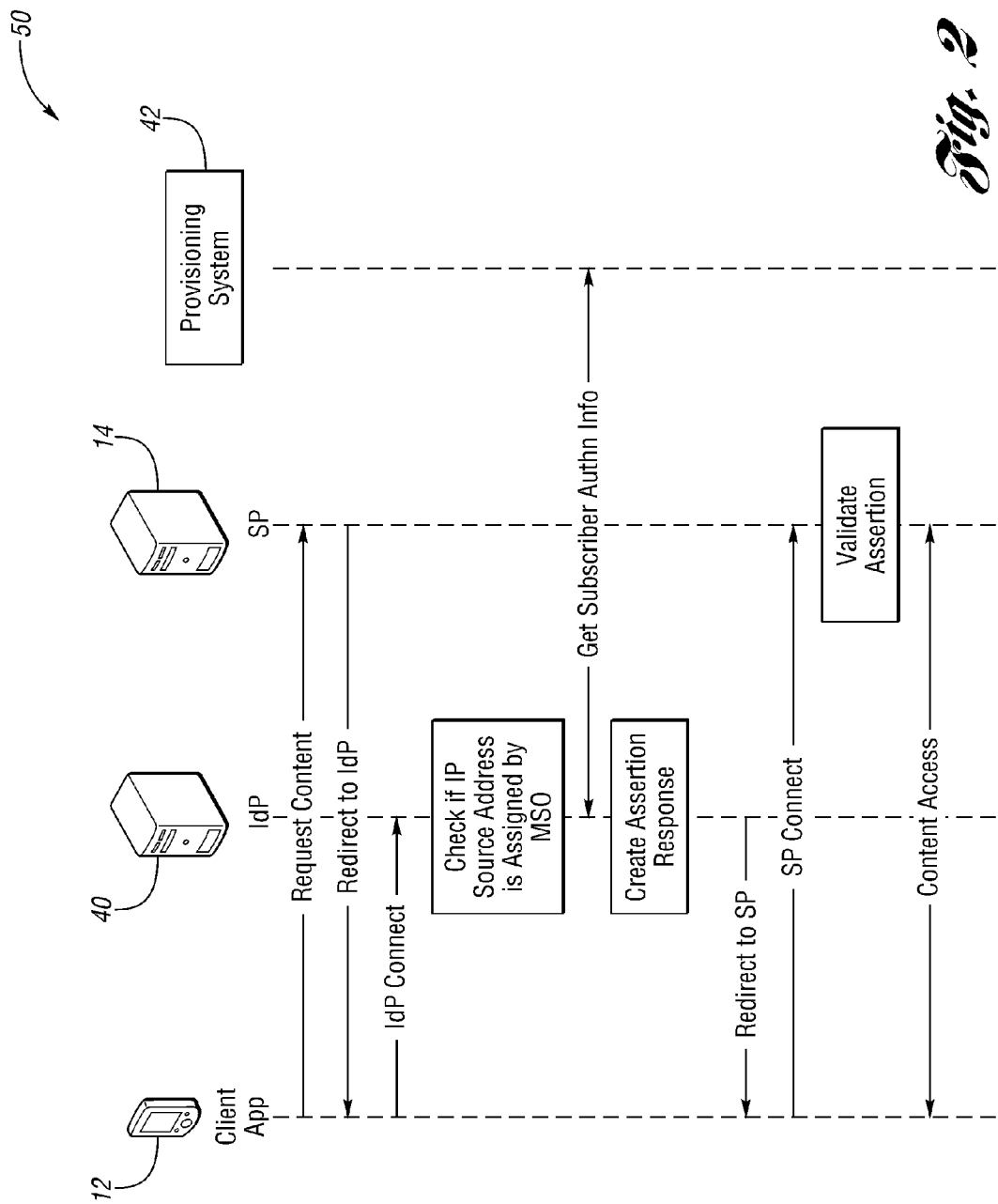
FIG. 2 illustrates a messaging diagram of zero sign-on messaging contemplated by one non-limiting aspect of the present invention.

FIG. 2 illustrates a messaging diagram 50 of the messaging that may be exchanged to facilitate the zero sign-on contemplated by one non-limiting aspect of the present invention. To authenticate a request from a user device 12, the service provider 14 may send an authentication request in the client application redirect to an identity provider (IdP) 40 and wait for a response that contains an assertion indicating that the subscriber has been authenticated. The response may also contain some authorization information. The IdP 40 may be a centralized subscriber authentication entity within a trusted domain 38 of the service provider 14 and/or with a trusted third party (not shown). When requested by the service provider 14, the IdP 40 may be able to authenticate subscribers and provide an assertion token to the service provider 14 that can be used for making content access decisions. The IdP 40 may be configured with the IP subnet used by a DHCP server 43 to assign IP addresses to the client application within the MSO's trusted domain/network.

If the service provider 14 does not know the IdP 40 of the subscriber it may prompt the subscriber for it. If the service provider needs additional authorization data it may directly issue requests to the MSO's authorization server (not shown) after the subscriber has been authenticated. The service provider 14 can be located anywhere, e.g., at the first and second locations 20, 22. It can be located in the back-end or on a gateway device (IPS) of an MSO's network. It can also be located on an external web site. Where ever the client application connects to request services/content is where the service provider 14 may be considered to be located.

One non-limiting aspect of the present invention contemplates enabling zero sign-on for a subscriber to access services and content at different web sites (MSO and Vendor) without having to enter a username and password to login. It does this by leveraging the existing security infrastructure of the cable network or other type of network associated with the service provider 14. When the client application requests content from the service provider 14 it may be redirected to the IdP 40 for authentication. When the IdP 40 receives the redirected authentication request from the client application it may check to see if the IP source address (e.g., IP addressed assigned by the access point) is within the MSO's IP address subnet for client devices 12 (e.g., within its trusted domain 38).

If the IP source address is within the trusted domain 38, the IdP 40 queries the provisioning system 42 for subscriber information ID using the IP source address. The IdP 40 may then create the assertion response and send it to the service provider 14. Importantly, this authentication may be done without prompting the subscriber for authentication credentials (username and password). After verifying the assertion token the service provider 14 may allow the client application to access content. If the redirected authentication request has not come from the MSO's network the IdP 40 would require the subscriber to authenticate using their credentials (username password) unless the Client App has a valid security context.

After the IdP 40 has authenticated the client application using zero sign-on it may establish an authentication session or security context with the client application and create a temporary token or cookies that is stored on the client application. When a service provider (any SP) redirects the client application again to the IdP 40 for authentication, the IdP 40 can immediately respond with an authentication assertion if the cookie is still valid (not expired) without having to prompt the subscriber. Optionally, as long as the client application has a valid authentication session cookie it can connect to any service provider 14, 16 that is in the same circle of trust as the IdP 40 and not have to require its subscriber to login in with credentials. This is independent of the access network used, which means the subscriber can move their client application from the cable network to another access network, connect to a service provider 16 in a different domain and continue to still enjoy zero sign-on functions.

The IdP 40 uses the IP source address of the client application to query the provisioning system 42 for subscriber info in order to create an appropriate assertion response. FIG. 3 illustrates a messaging diagram 60 for determining the subscriber associated with the IP source address in accordance with one non-limiting aspect of the present invention. When a client application requests an IP address the CMTS 32 inserts the subscriber's cable modem 30 MAC address, which is known and trusted by the service provider 14, in the request before forwarding it to a DHCP 43 server. After the DHCP 43 assigns an IP address to the client application may then notify the provisioning system 42 and indicate which cable modem 30 MAC address it is associated with. It may also notify the provisioning system 42 when an IP address is not associated with a given cable modem MAC address (expires or assigned to another device). Therefore, the provisioning system may create a mapping of client application IP source addresses that are associated with a subscriber's cable modem MAC address.

Once the cookie expires, the client application would need to be re-authenticated, but that can be done automatically (zero sign-on) when the client application is connected to the cable network again. If the client application was not able to connect to the cable network before the cookie expires, the IdP 40 can prompt the subscriber for credentials (username and password) which would renew the authentication session token (single sign-on). The cookie may be provisioned to last for a certain period, such as one day, week month, six months, before it needs to be refreshed. The cookie may be used in this manner to facilitate zero sign-on access to websites or other service provider portals used by subscribers to access media for the period without the subscriber having to sign-on. Since the cookie may be stored on the computer-readable medium of the user device 12, any user in possession of the user device 12 would receive access to the corresponding media services.

One non-limiting aspect of the present invention contemplates enhancing the security credentials (e.g., token, cookie, etc.) stored on the user device 12 by instead storing a certificate. The certificate may be more robust than username and password credentials. Passwords can be too simple and easily guessed by hackers or vulnerable to dictionary attacks. They can also be shared with friends leading to unauthorized access to service. Digital certificates are not subject to these vulnerabilities and provide a stronger level of subscriber authentication. Once a subscriber has a digital certificate installed on their device it can also provide a Zero Sign-on experience since the certificate can be used to authenticate the subscriber instead of a username and password.

One challenge with subscriber digital certificates is installing them on the subscriber's device 12 in a secure manner. One approach is to have the subscriber download and install a certificate manager application that creates a Certificate Signing Request (CSR) and sends it to a certificate issuing server. Before the server can issue the certificate it needs to authenticate the subscriber. If just a user name and password is used then the increased authentication strength provided by the certificate is lost. Security is only as strong as its weakest link. A stronger form of subscriber authentication may be used to control issuance of the digital certificates.

The DOCSIS network 34 described above or another type of network (e.g., a cellular network between the access point and the service provider) can be used to support two factor subscriber authentication which is suitable for issuing subscriber certificates. The certificate issuing server (e.g., IdP 40, CMTS 32, or other element with the trust domain 38 of a particular service provider 14) may perform two factor subscriber authentication by doing the following: 1—verifying the subscriber has a valid username and password, such as by requiring the subscriber to perform a single sign-on; and 2—verifying that the CSR request has a source IP address that is associated with the subscriber's authenticated cable modem 30, such as according to the address assurance process described below. If both of these verification steps are successful, the authentication level of the subscriber should be strong enough for the certificate issuing server to issue a certificate to the subscriber's device.

The certificate may contain the subscriber's name or username and the MAC address of the user device, access point, and/or CMTS 32. Including the MAC address may be helpful in preventing the certificate from being shared across devices. Once a certificate is installed on the user device 12 it can be used to automatically authenticate them when they access services or content on the Internet without using a username and password. The CableLabs OLCA specification, the disclosure of which is hereby incorporated by reference in its entirety, defines how cable operators and their partners may use SAML federated single sign-on authentication to enable subscribers to access their video content on line using their cable operator account credentials. Subscribers are normally authenticated with a username and password, but certificates can be used to provide a zero sign-on experience.

When the subscriber connects to the cable operator's site for authentication, on their home network or on an external network, zero sign-on can be accomplished with a mutually authenticated Transport Layer Security (TLS) connection. Certificates can be automatically exchanged between server and client. If certificate validation is successful the server responds with a SAML Assertion redirect command that sends the subscriber back to the service provider for assertion validation and access to the requested content/service. Certificates provide a stronger level of authentication and therefore do not have to be renewed as frequently as the cookie noted above, e.g., not more than once every six months or longer. When a certificate needs to be renewed, say after a one year time period, the certificate manager application connects to the certificate issuing server and installs a new certificate. If the existing certificate has not yet expired, certificate renewal can occur on or off the home network since both the valid certificate and the subscriber's username & password can be used for two factor authentication. If the existing certificate has expired certificate renewal may need to occur on the home network to provide two factor authentication for the certificate issuing server as described with initial certificate issuance.

Figure 4A:
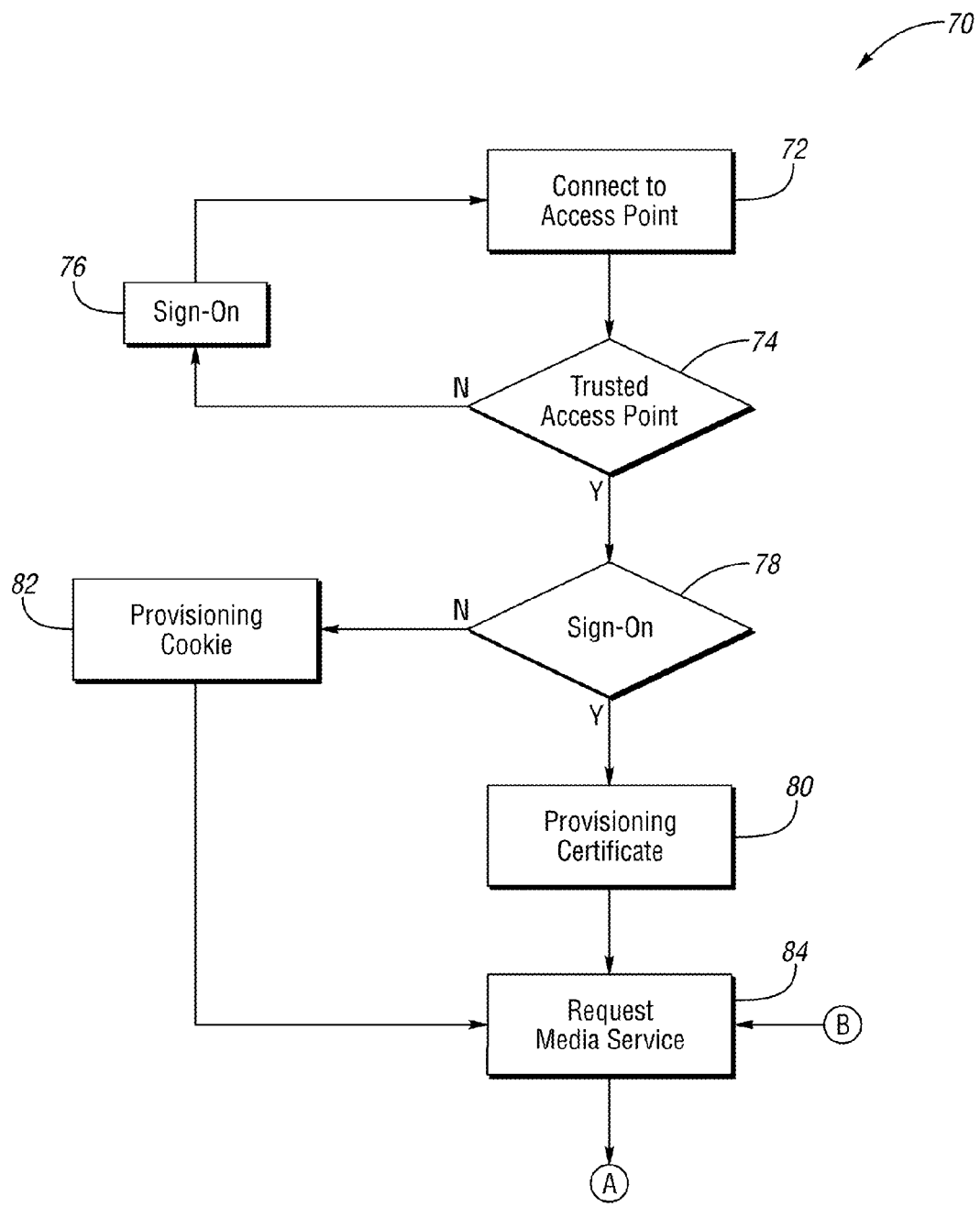
FIGS. 4a-4b illustrate a flowchart of a method for supporting a zero sign-on process contemplated by one non-limiting aspect of the present invention.
Figure 4B:
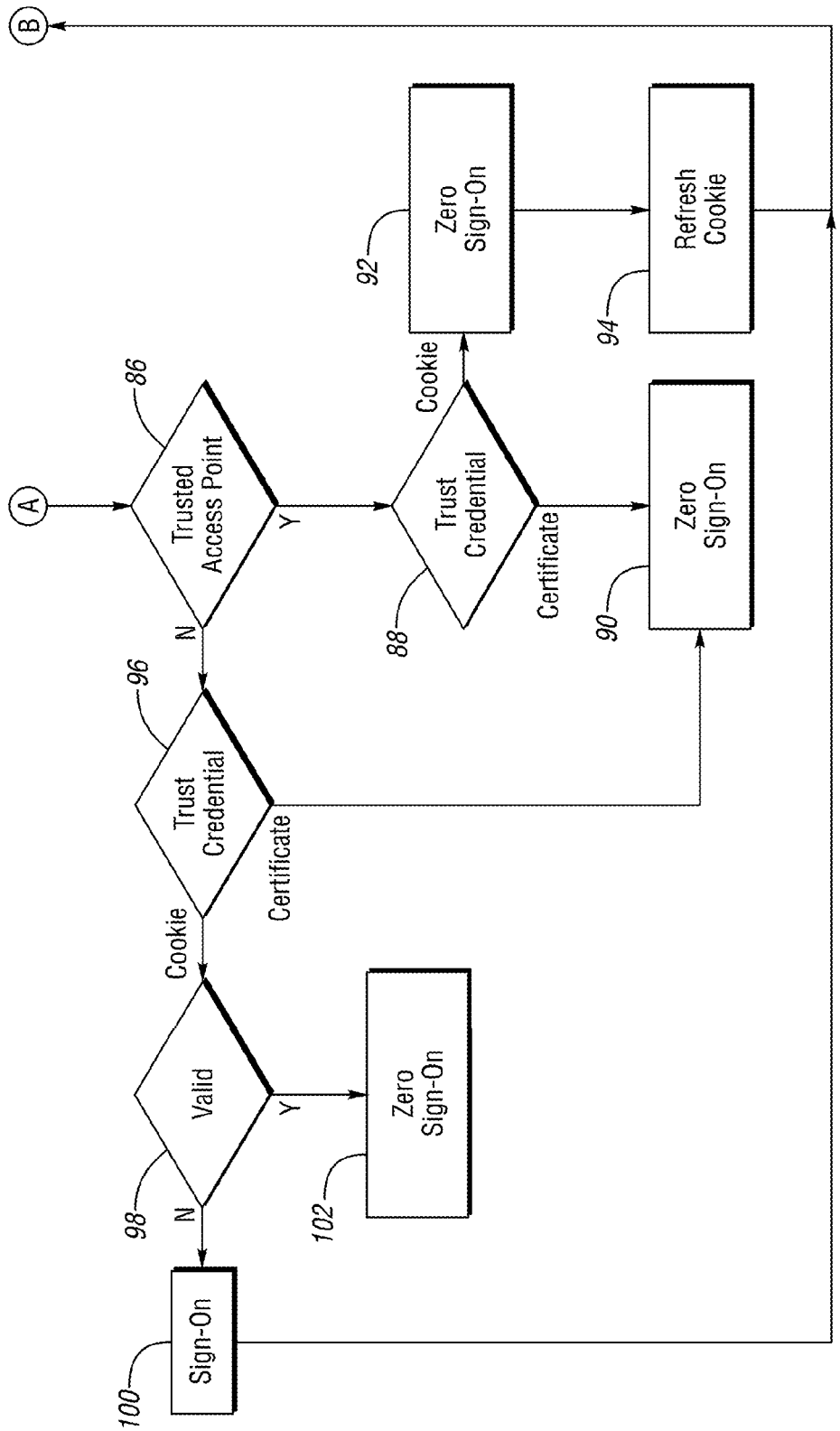
Figure 6:
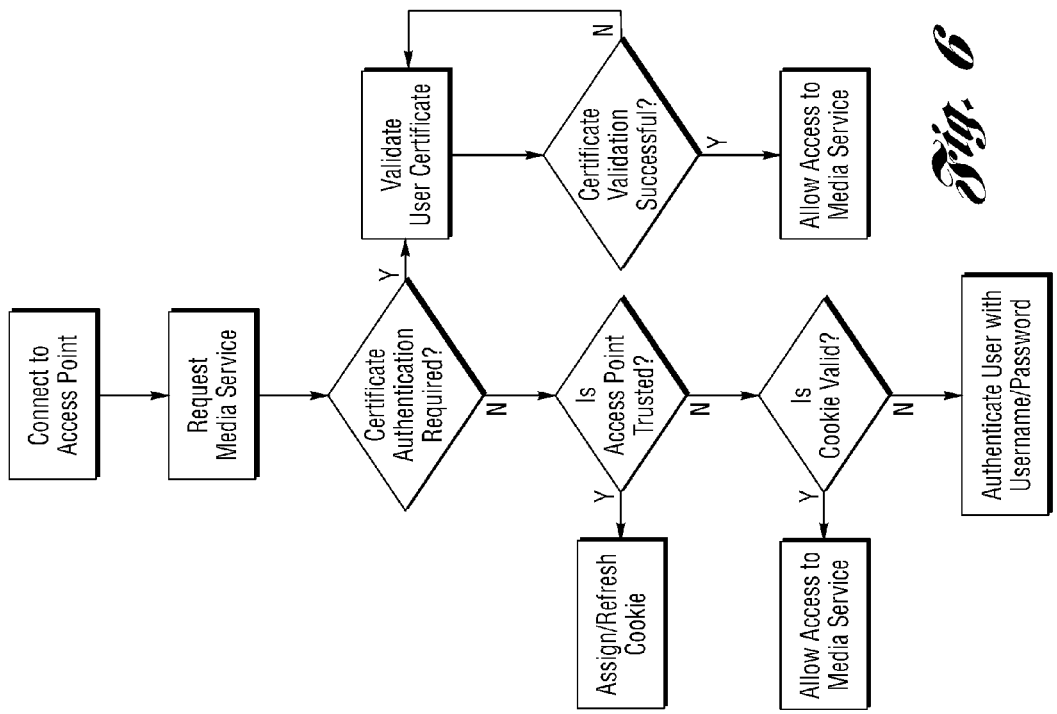
FIG. 6 illustrates a flowchart of a method for supporting a zero sign-on process contemplated by one non-limiting aspect of the present invention.
Figure 5:
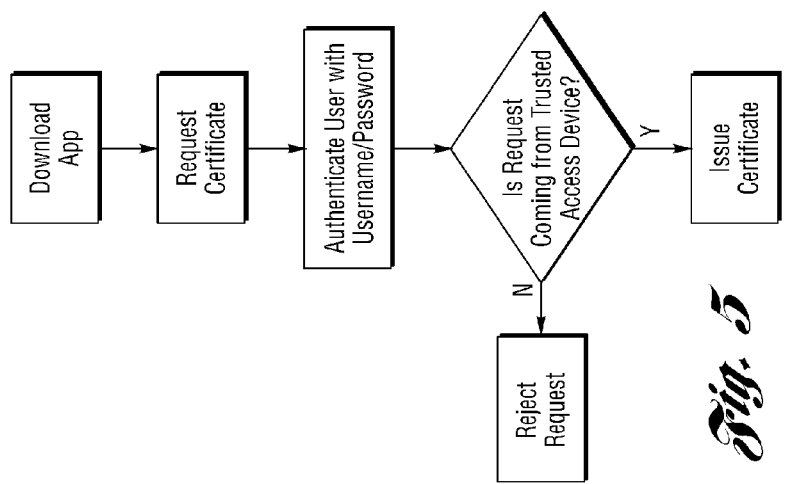
FIG. 5 illustrates a flowchart of certificate provisioning as contemplated by one non-limiting aspect of the present invention.

As supported above, the present invention contemplates a zero sign-on process where trust credentials (e.g., a cookie or a certificate) is stored on the user device 12 to facilitate automatic, zero sign-on, authentication and access to media services. FIGS. 4a-4b illustrate a flowchart 70 of a method for supporting a zero sign-on process where use of both of the cookie and the certificate are described in accordance with one non-limiting aspect of the present invention. While the use of one or more of the cookie and certificate is described, the present invention fully contemplates facilitating a similar zero sign-on process that relies solely on the processes associated with one of the cookie and the certificate, i.e., for use in environments where use of the only the cookie or only the certificate is desirable.

Block 72 relates to a user device connecting to an access point for the first time or before being assigned a cookie or a certification, such as when the user device is initially deploy. The access point, for exemplary non-limiting purposes, is described predominately with respect to being a cable modem or similar edge type device to which a router or other gateway is connected to facilitate wireless communications with one or more user devices. The access point, however, need not be such as device, and particularly, not such a device where the connection thereto is controller locally by its operator. The access point may be a CMTS or other interface to one of the service provider supported networks.

The exemplary illustration of the user device connecting to a local wireless router that then communicates it the service provider by way of the cable modem and the CMTS is shown as it relates to a particular scenario where the contemplated zero sign-on may be helpful in allowing subscribers to continuously access services while their user device is mobile between trusted and untrusted between access points. This is believed to predominately occur with respect to the user devices moving wireless networks, i.e., those supported with a wireless router. Of course, cellular and/or broadcast networks may not include a router as the access point and instead rely on another devices, such as but not limited to macro, micro, pico, or femto cell. The present invention fully contemplates the zero sign-on process applying to these other types of access points and the corresponding communication mediums.

Block 74 relates to assessing whether the connected access point is trusted. The access point may be considered to be one of trusted and untrusted depending on whether it is within the trust domain of the service provider from which the user device is attempting to access media services. This assessment may require the user device to identify the media services it is attempting to access or to otherwise identifying the service provider from which services are requested. One test of trustworthiness may be based on the IP address assign to the user device at the time of making the request to access the media services. If the IP address is within a trust domain of IP address of the service provider, e.g., within the IP subnet of one of the service provider's trusted CMTSs, the access point may be considered trusted, and if not, untrusted.

Block 72 may be returned to if the access point is untrusted since it may be undesirable to initially provision the user device with a trust credential (i.e., one or both of the cookie and/or certificate) through an untrusted access point. Optionally, Block 76 relates to the user being given the option to access the requested media service by entering their username and password in a sign-on operation. The user can then access entitled media services prior to being provisioned with trust credential if the username and password is verified.

Block 78 relaters to the access point being trusted and assessing where a sign-on operation has been implemented. The sign-on operation may be an optional step where the subscriber decides whether to provision the user device with a cookie and/or a certificate as the trust credential. Optionally, rather than allowing the subscriber to decide, the service provider may require a certain action in that the subscriber may be forced to sign-on and/or the service provider may automatic force cookie provisioning, such as based on subscriber contractual commitments and/or subscriber behavior (e.g., if the subscriber and/or user device is or has been conducting operations considered inappropriate, provisioning of the more secure and long lasting certificate may be prevented).

Blocks 80, 82 relate to provisioning the user device with one or both of the cookie and the certificate. The certificate may require transmission to the access point through in-band signaling or through a proprietary portion of the server provider's trusted domain in order to increase the security of its transmission. The cookie may be transmitted in a similar manner and/or it may be transmitted through out-of-band signaling or over the internet since its security is less of a concern, e.g. the cookie may be transmitted through a Secure Sockets Layer (SSL) pipe. The SSL pipe may be less secure than the in-band signaling since the in-band signaling occurs between known endpoints and the SSL pipe need not.

The foregoing portions of the zero sign-on method may be generally referred to as a provisioning stage in that the user device is provisioned to store one or both of the cookie and certificate. This stage, however, may be optional and avoided in the event the user device has already been provisioned with a trust credential, such as at the time of purchase or installation (preferably installation by an authorized, trusted representative of the service provider). The next portion of the flowchart may be generally referred to as an authentication stage where the user device is authenticated, potentially with a zero sign-on operation, to access media services according to the stored trust credential.

Block 84 relates to determining a request for media services from the user device. This assessment may be the same as the assessment above in Block 72 with respect to connecting the user device to the access point. Block 84 is shown simply to illustrate a beginning of the authentication stage and it may be skipped in the event a sufficient determination has already been made. Block 84 may be triggered upon issuance of the request to access media services, such as if the user device access a website to request content from a particular service provider. Other triggering events may be also be equivalent to determining a need for authenticating the user devices, such as turning "on" of the user device, entering "send" when dialing a phone call (e.g., to authenticate for cellular access), etc.

Block 86 relates to assessing whether the access point being used by the user device at the time of requesting access to the media services is a trusted access point. The assessment of whether an access point is trusted is sufficiently described herein, and in the event it has already been determined in Block 74, Block 86 may be skipped accordingly. Block 88 is particularly concerned with the trusted/untrusted assessment being used to differentiate whether the trust credential is needed to facilitate zero sign-on. As described below in more detail, one non-limiting aspect of the present invention contemplates facilitating zero sign-on without reliance on the trust credential, such as based on the trusted state of the access point.

Block 88 relates to the access point being determined to be trusted. This may occur, for example, if the user device is connected to an access point at the home of the subscriber associated with the user device, i.e., the person authenticated to be the principal owner of the user device, and/or that the user device is located at another home or other location where the access point is associated with someone other than the owner of the user device where the corresponding access point is still within the trust domain of the service provider, e.g., if the subscriber takes there user device to a neighbor and connects to the neighbor's access point.

Block 88 also differentiates the next phase of the authentication stage depending on whether the trust credential stored on the user device is a cookie and/or a credential. In the event both types of trust credentials are stored on the user device, one or the other may be manually selected by the user or automatically by the client application automatically used, such as the certification since it is likely to be the most secure. Optionally, however, the particular access point and/or media service may dictate the used trust credential, e.g., a certain website may be more conducive to use of the cookie than the certificate.

Block 90 relates to performing a certificate based zero sign-on operation where the user device is authenticated to access the media services associated with the certificate stored thereon. In the event multiple certificates are stored, such as if the user device is used with different subscribers, the user device may be configured to automatically select the certificate without requiring user interaction in order to maintain zero sign-on functionality, such as by selecting the certificate to correspond with the identity of the user as dictated by current and past operating characteristics and performance of the user device, i.e., the client application may be able to identify the user without the user having to input information such that the certificate associated with that user may be automatically selected.

Block 92 relates to performing a cookie based zero sign-on operation where the user device is authenticated to access the media services associated with the cookie stored thereon. In the event multiple cookies are stored, such as if the user device is used with different subscribers, the user device may be configured to automatically select the cookie without requiring user interaction in order to maintain zero sign-on functionality, such as by selecting the cookie to correspond with the identity of the user as dictated by current and past operating characteristics and performance of the user device, i.e., the client application may be able to identify the user without the user having to input information such that the cookie associated with that user may be automatically selected.

Optionally, the cookie may include a relatively small amount of data or otherwise not be configured to specifically identify the user and/or the entitlements of the user with respect to the media services. This may be done in order to ameliorate processing demands and/or backend operations required to categorize cookies for large number of users. Instead, the cookie may be used simply to indicate a trusted entity such that the user device, even though it is not specifically verified, is assumed to be trustworthy because it has the cookie.

Optionally, the use of the cookie in Block 92 may be omitted if the service provider is willing to accept the fact that the user device is connected to a trusted access point as sufficient proof of its trustworthiness. This scenario may be used to facilitate whole home access to the same types of content, such as in a traditional television transmission scenario where all television in a home can access the same content to any device allowed to connect to the access point. Additional options may include at least partially relying on the cookie in order grant access to certain media services, such as is common with the need for a STB or DVR to access certain television signaling not otherwise available to all televisions within the same home.

In the event the cookie is not used, or the used cookie is not self-identifying and/or it is desirable to avoid performing other operations to identify the user device and/or user, such as by matching MAC address or perform some other mapping operation, the entitlements/media permission authenticated to the user device may instead be those associated with the access point. Since the service provider is likely to have already referenced a billing address and other media permission to the access point, extending those same permissions to the user device may be done relatively simply, i.e., without having perform extra MAC or IP address matching that would not otherwise have to be performed.

Block 94 relates to refreshing the cookie if used and/or stored on the user device. The refresh may be used to extend the validity of the cookie beyond that specified in its last provisioning. Rather than disrupting service when a cookie is being used on a relatively frequent and trusted basis, the cookie may be automatically refreshed to maintain zero sign-on continuity. This can be helpful in maintaining zero sign-on capabilities for user that frequently access the same websites and/or media services.

Returning to Block 86, in the event the access point is deemed to be untrusted, Block 96 is reached to make an assessment of which trust credential is to be used. Block 96 may be reached, for example, if instead of taking the user device to a neighbor's home network, the user takes the user device to a Wi-Fi hotspot outside of the service providers trust domain. The trust credential selected in Block 96 may be determined in a process equivalent to the process in Block 88. If the certificate is used, the process of Block 90 is used to facilitate access to the media services. Since the provisioning of the certificate is done in more restrictive manner than the cookie, it may be acceptable to the service provider to disregard the untrustworthiness of the access point in light of the relatively trustworthy certificate.

Block 98 relates to assessing whether the cookie is valid in the event the user device does not include a certificate or the stored certificate is otherwise not used as part of the authentication process. The cookie may be valid for a limited period of time, as described above. Block 100 relates requiring the user to complete a sign-on operation if the cookie is invalid so that access can be granted to the media service. Block 102 relates to performing zero sign-on in the event the cookie is valid, such as in a manner equivalent to Block 92. Optionally, Block 102 may require use of the cookie to execute the zero sign-on, as opposed to Block 92 which permits zero sign-on without reliance on the cookie due to the access point being trusted. Since the access point is untrusted, Block 94 may be bypassed in order to force connection of the user device to a trusted access point before permitting refresh.

As noted, the IP source addresses may be used to support zero sign-on capabilities. The present invention contemplates implementing an address assurance process to insure the IP address are verified and not spoofed or otherwise compromised. Optionally, the zero sign-on contemplated by the present invention may rely on a DOCSIS cable modem (access point) MAC address and the client application's IP source address.

The cable modem MAC address spoofing or cloning can be prevented by the following: enforcing DOCSIS BPI+. BPI+ uses digital certificates to authenticate the CM, including MAC address validation (DOCSIS 3.0, the disclosure of which is hereby incorporated by reference in its entirety provides a BPI+ Enforce feature); and MAC address domain validation wherein the cable modem provisioning system only allows a cable modem to operate in an authorized CMTS MAC address domain such that if a hacker tries to clone the MAC address and use it in a different MAC address domain the provisioning system will block it (note: The CMTS blocks duplicate MAC address in the same domain).

The IP Address spoofing can be prevented by the following: router configuration (device connected cable modem/access point) may be required to prevent traffic from outside of the MSO's trusted domain (e.g., outside network (Internet)) to have source IP addresses within the MSO's client subnet; and source address verification where client applications on the MSO's network can only use IP addresses assigned by the MSO's provisioning system (DOCSIS 3.0 provides this feature).

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A non-transitory computer-readable medium having a plurality of non-transitory instructions operable with a processor to facilitate authenticating a device for zero sign-on (ZSO) access to media services available through a plurality of access points, the non-transitory instructions being for:
   determining a credential request received from the device through a first access point of the plurality of access points, the credential request being issued to request a trust credential for authenticating access to the media services;
   determining whether the first access point is one of trusted and untrusted as a function of identifying information included with the credential request;
   facilitating transport of the trust credential through the first access point to the device if the first access point is determined to be trusted;
   denying transport of the trust credential through the first access point to the device if the first access point is determined to be untrusted;
   determining a media request received from the device through a second access point of the plurality of access points, the media request being issued to request access to the media services through the second access point;
   determining whether the second access point is one of trusted and untrusted as a function of identifying information included with the media request;
   facilitating ZSO access to the media services through the second access point if the second access point is trusted and the trust credential was transported to the device; and
   facilitating ZSO access to the media services through the second access point if the second access point is untrusted and the trust credential is received from the device through the second access point;
   determining the first access point to be trusted if the identifying information included with the credential request includes an Internet protocol (IP) address within a trusted domain and to be untrusted if the IP address fails to be within the trusted domain;
   determining a home network associated with a user of the device and previously determined to be trusted;
   determining the trust credential to be one of expired and unexpired; and
   providing the device instructions to return to the home network to re-issue the credential request if transport of the trust credential is denied due to the first access point being untrusted and the trust credential is expired.

2. The non-transitory computer-readable medium of claim 1 further comprising the non-transitory instruction being for determining the IP address to be a source address added to the credential request by the first access point, the source address being previously included within the credential request by the device as a destination address.

3. The non-transitory computer-readable medium of claim 1 further comprising the non-transitory instructions being for:
   determining the first access point to also be trusted if the identifying information included with the credential request includes a Media Access Control (MAC) address within a trusted domain and to also be untrusted if the MAC address fails to be within the trusted domain; and
   facilitating the ZSO access by delivering signaling to the device to access the media services without requiring a user of the device to correspondingly sign-on or enter a password as part of an authentication process required before permitting access to the media services.

4. The non-transitory computer-readable medium of claim 3 further comprising the non-transitory instructions being for:
   polling a plurality of termination stations operable with the plurality of access points to provide the media services thereto, including determining whether any of the termination station have a duplicate of the MAC address; and
   determining the first access point to be untrusted if the MAC address is within the trusted domain and the duplicate is determined.

5. The non-transitory computer-readable medium of claim 1 further comprising the non-transitory instructions being for instructing the device to transport a user identifier input to the device while connected to the second access point to facilitate non-ZSO access to the media services through the second access point if the second access point is untrusted and the trust credential is either not received from the device through the second access point or the trust credential is expired.

6. The non-transitory computer-readable medium of claim 1 further comprising the non-transitory instructions being for:
   determining a device identifier included within the media request for relating the device to the trust credential;
   facilitating the ZSO access to the media services through the second access point as function of the device identifier without requiring the device to transport the trust credential through the second access point if the second access point is trusted; and
   facilitating the ZSO access by delivering signaling to the device to access the media services without requiring a user of the device to correspondingly sign-on or enter a password as part of an authentication process required before permitting access to the media services.

7. The non-transitory computer-readable medium of claim 1 further comprising the non-transitory instructions being for:
receiving the trust credential from the device through the second access point prior to facilitating the ZSO access to the media services; and
limiting the ZSO access according to entitlements associated with the received trust credential.

8. A non-transitory computer-readable medium having a plurality of non-transitory instructions operable with a processor to facilitate authenticating a device for zero sign-on (ZSO) access to media services available through a plurality of access points, the non-transitory instructions being for:
determining a credential request received from the device through a first access point of the plurality of access points, the credential request being issued to request a trust credential for authenticating access to the media services;
determining whether the first access point is one of trusted and untrusted as a function of identifying information included with the credential request;
facilitating transport of the trust credential through the first access point to the device if the first access point is determined to be trusted;
denying transport of the trust credential through the first access point to the device if the first access point is determined to be untrusted;
determining a media request received from the device through a second access point of the plurality of access points, the media request being issued to request access to the media services through the second access point;
determining whether the second access point is one of trusted and untrusted as a function of identifying information included with the media request;
facilitating ZSO access to the media services through the second access point if the second access point is trusted and the trust credential was previously transported to the device;
facilitating ZSO access to the media services through the second access point if the second access point is untrusted and the trust credential is received from the device through the second access point;
determining the first access point to be trusted if the identifying information included with the credential request includes an Internet protocol (IP) address within a trusted domain and to be untrusted if the IP address fails to be within the trusted domain;
determining a home network associated with a user of the device and previously determined to be trusted;
determining the trust credential to be one of expired and unexpired proximate in time to issuance of the media request; and
providing the device instructions to return to the home network to re-issue the credential request if the second access point is untrusted and the trust credential is expired.

9. The non-transitory computer-readable medium of claim 8 further comprising the non-transitory instruction being for determining the IP address to be a source address added to the credential request by the first access point, the source address being previously included within the credential request by the device as a destination address.

10. A method for authenticating a device for zero sign-on (ZSO) access to media services available through a plurality of access points, the method comprising:
determining a credential request received from the device through a first access point of the plurality of access points, the credential request being issued to request a trust credential for authenticating access to the media services;
determining whether the first access point is one of trusted and untrusted as a function of identifying information included with the credential request;
facilitating transport of the trust credential through the first access point to the device if the first access point is determined to be trusted;
denying transport of the trust credential through the first access point to the device if the first access point is determined to be untrusted;
determining a media request received from the device through a second access point of the plurality of access points, the media request being issued to request access to the media services through the second access point;
determining whether the second access point is one of trusted and untrusted as a function of identifying information included with the media request;
facilitating ZSO access to the media services through the second access point if the second access point is trusted and the trust credential was previously transported to the device;
facilitating ZSO access to the media services through the second access point if the second access point is untrusted and the trust credential is received from the device through the second access point;
determining the first access point to be trusted if the identifying information included with the credential request includes an Internet protocol (IP) address within a trusted domain and to be untrusted if the IP address fails to be within the trusted domain;
determining a home network associated with a user of the device and previously determined to be trusted;
determining the trust credential to be one of expired and unexpired proximate in time to issuance of the media request; and
providing the device instructions to return to the home network to re-issue the credential request if the second access point is untrusted and the trust credential is expired.

11. The method of claim 10 further comprising determining the IP address to be a source address added to the credential request by the first access point, the source address being previously included within the credential request by the device as a destination address.

* * * * *